United States Patent

[11] 3,536,176

| [72] | Inventor | Carlo Cappa<br>via Crocicchio, 42, Crema, Italy |
|---|---|---|
| [21] | Appl. No. | 754,353 |
| [22] | Filed | Aug. 21, 1968 |
| [45] | Patented | Oct. 27, 1970 |

[54] INTERRELATED CLUTCH-ENGINE-TRANSMISSION-BRAKE CONTROLS FOR VEHICLES
5 Claims, 7 Drawing Figs.

[52] U.S. Cl. .................................................. 192/.044,
192/.055, 192/.076
[51] Int. Cl. ..................................................... F16d 67/00
[50] Field of Search ........................................... 192/.076,
.055, .033, .044, 91

[56] References Cited
UNITED STATES PATENTS

| 2,217,940 | 10/1940 | Bragg | 192/.076X |
| 2,252,136 | 8/1941 | Price | 192/91X |
| 2,510,042 | 5/1950 | Thomas | 192/.033 |
| 2,514,002 | 7/1950 | Long | 192/.033X |
| 2,517,025 | 8/1950 | Price | 192/.033X |

*Primary Examiner*—Benjamin W. Wyche III
*Attorney*—Stevens, Davis, Miller and Mosher ABSTRACT: A servomechanism for actuating the friction clutch of a vehicle in an automatic manner as a function of the vehicle speed, wherein the pressure differential between the two faces of a piston in a cylinder is exploited for actuating the clutch control members for engaging and disengaging the clutch, respectively. A speed-sensing member is also provided for changing the mode of operation of the servomechanism whenever a certain preselected critical speed of the vehicle is exceeded.

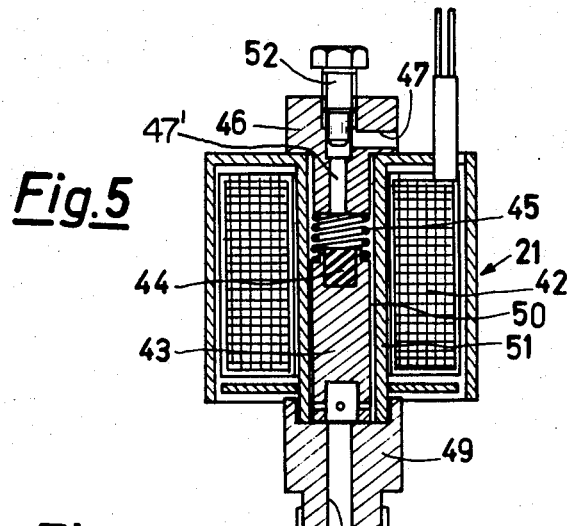
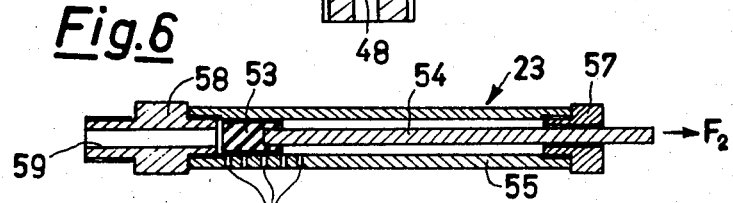
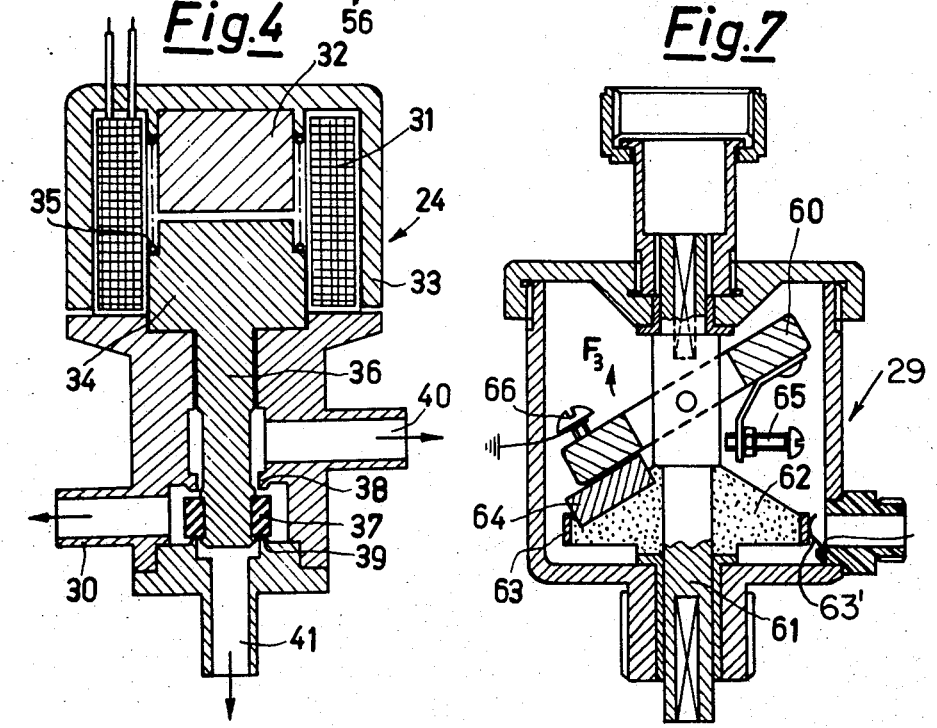

INTERRELATED CLUTCH-ENGINE-TRANSMISSION-BRAKE CONTROLS FOR VEHICLES

This invention relates to an automatic friction clutch servomechanism for vehicles in general.

An object of the invention is to provide a device adapted to disengage the friction clutch automatically by a single control and in an efficient manner while permitting a smooth and progressive engagement, corresponding exactly to the operations which would be effected by the control of the foot of an experienced driver, during the normal operation of the vehicle.

This object is achieved according to the invention by the device which comprises a housing containing two chambers separated by a piston which actuates the clutch control, one chamber being connected to a magnetic valve which is actuated only below a certain preselected speed of the vehicle by a microswitch which is controlled by the displacement of the accelerator, said magnetic valve connecting said chamber to either a vacuum reservoir or to the atmosphere respectively. The other chamber of the cylinder having an automatic valve for inlet of the atmosphere only; a sleeve for venting the drawn-in air, said sleeve being adjustably positioned with respect to an air outlet passageway which is capable of being closed by a predetermined stroke of the piston; a progressively-venting valve mechanically connected to the accelerator control rods, said valve being opened proportionally to the displacement of said control rods; a venting magnetic valve which remains open when the vehicle exceeds a preselected speed and which valve is actuated by the operation of a centrifugal switch inserted in the motion-transmitting mechanism for the speedometer of said vehicle, said centrifugal switch also interrupting the operation of said microswitch actuated by the control rods of the accelerator as the vehicle exceeds said preselected speed.

In order that the features of the present invention may be better understood, an exemplary and nonlimiting embodiment thereof will be now described, reference being had to the accompanying drawings, wherein:

FIG. 4 is a cross-sectional view of a three way venting magnetic valve in its deenergized position.

FIG. 5 is a sectional view of a one way venting magnetic valve in its deenergized position.

FIG. 6 is a sectional view of a gradually operating venting valve.

FIG. 7 is a sectional view of a centrifugal switch.

Figure 1:
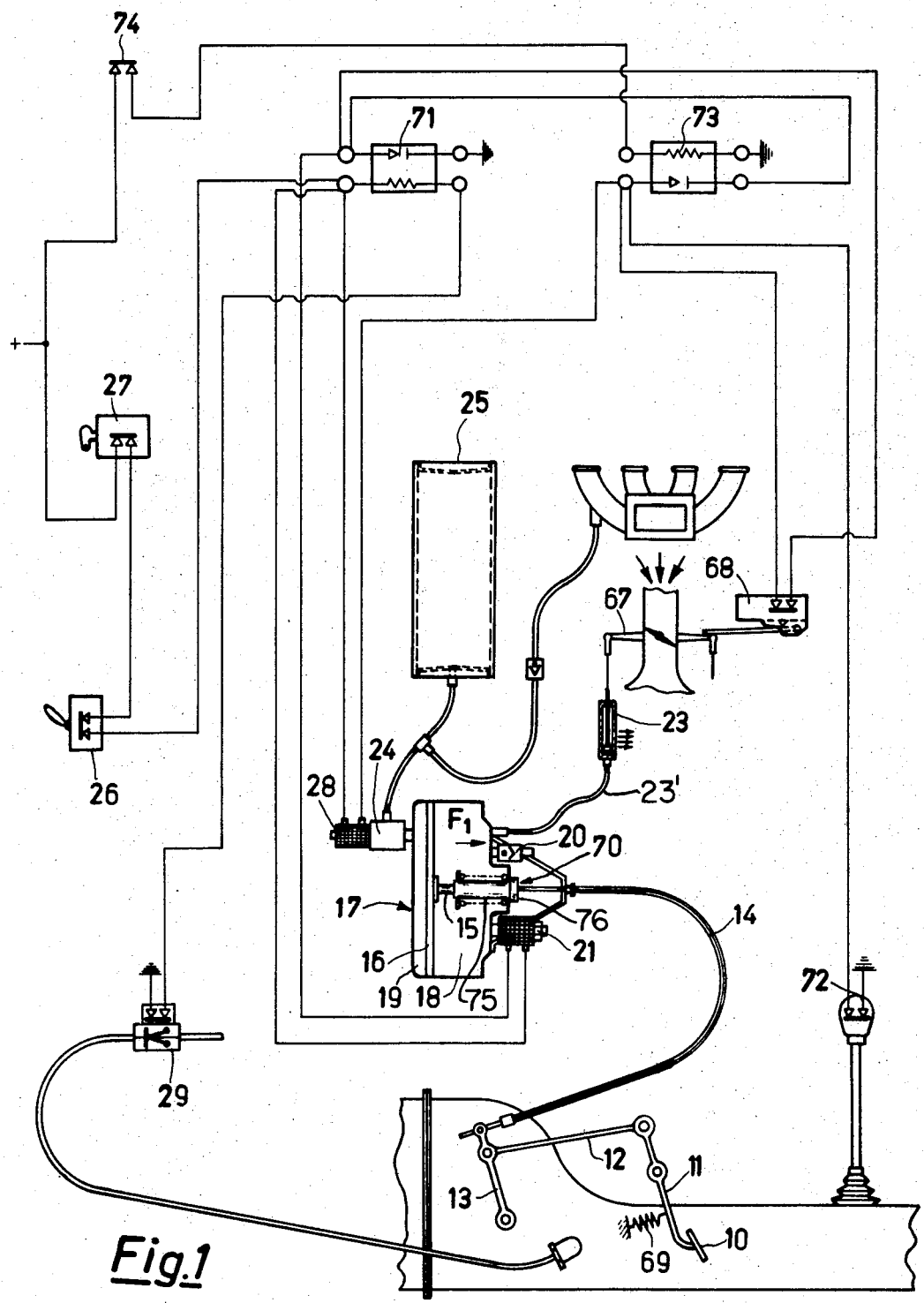
FIG. 1 is a block diagram of a device according to the invention, which also displays the wiring diagram for the electrical component parts with the mechanical component parts shown in the position they take when the clutch is disengaged.
Figure 2:
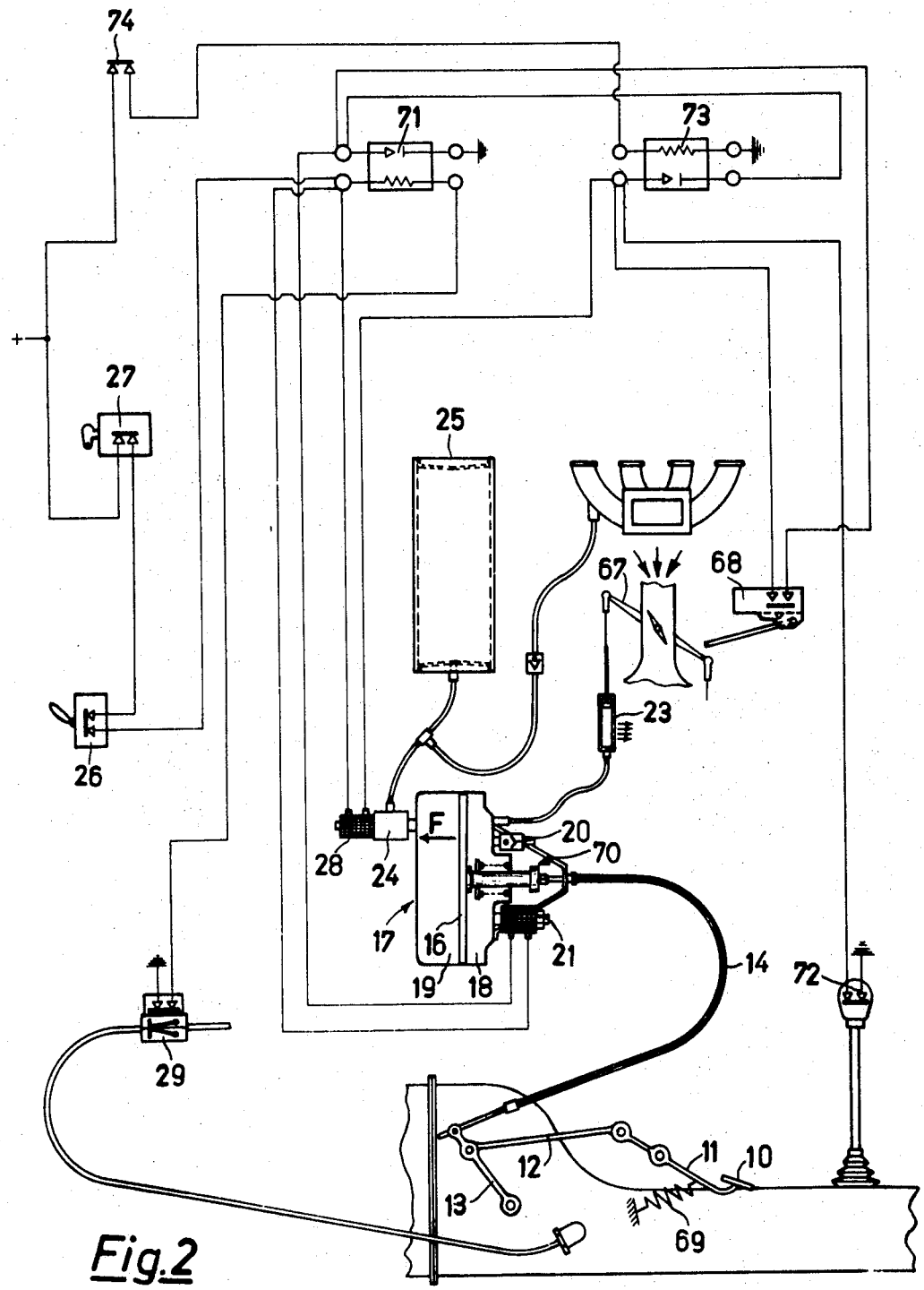
FIG. 2 is similar to the diagram of FIG. 1, but the mechanical component parts are shown in their positions as the clutch is engaged.
Figure 3:
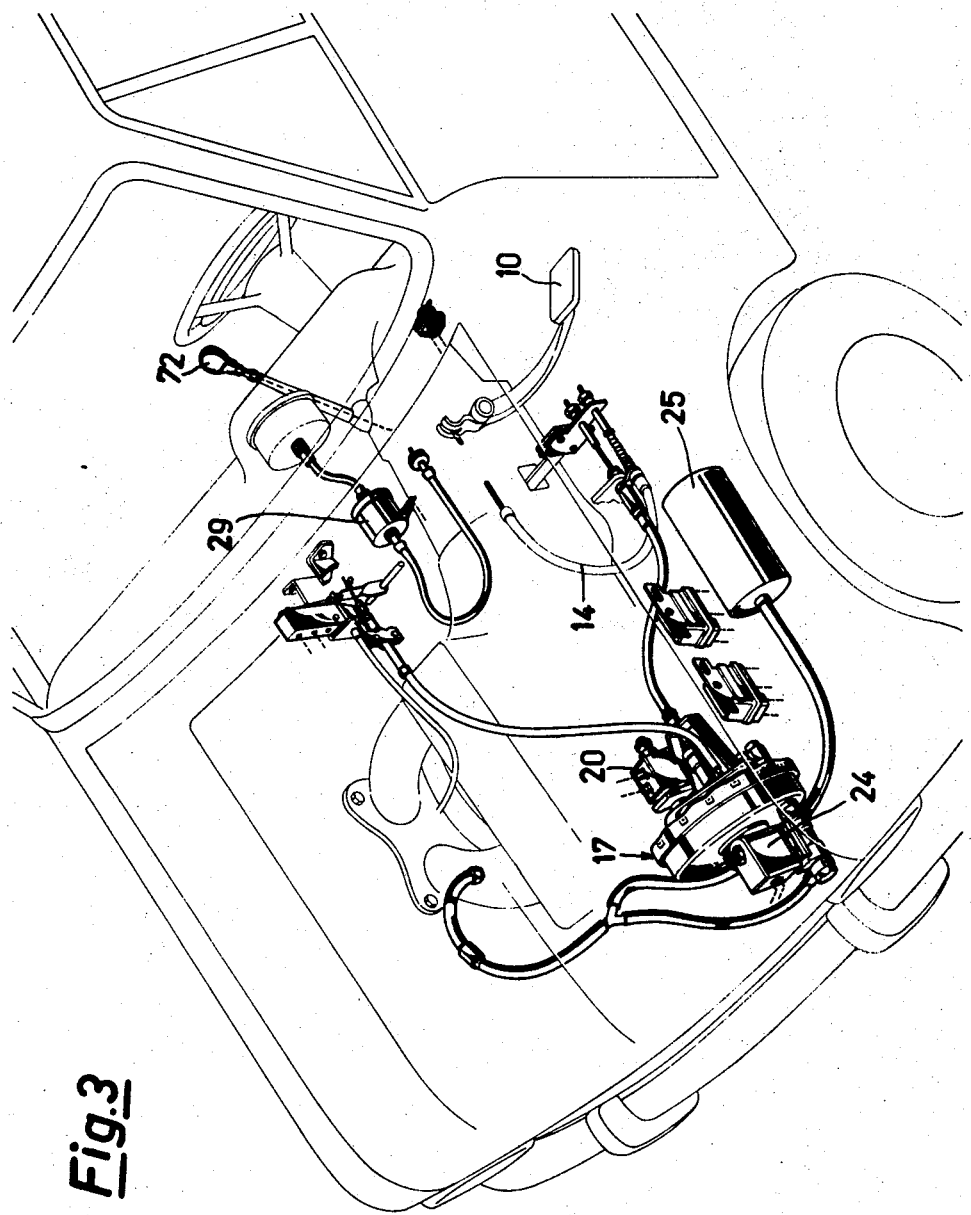
FIG. 3 is a perspective view of the device installed on a vehicle.

With reference to the block diagram shown in FIGS. 1 and 2, the clutch servomechanism of this invention will be now described as a whole prior to describing in detail its individual component parts. The numeral 10 indicates the conventional friction clutch pedal control of a vehicle, said pedal being connected by a linkage 11, 12, 13 and a flexible member 14, to the piston rod 15 of a piston 16 sliding within a housing 17.

The flexible member 14 can be replaced, of course, by a hydraulic control comprising a main pump controlled by the rod 15 which actuates a cylinder for controlling the linkage aforementioned.

The piston 16 divides the housing 17 into two chambers 18 and 19. The chamber 18 communicates with the atmosphere through a unidirectional inlet valve 20, a venting magnetic valve 21, an adjustable valve 70, and conduit 23' to a progressively-venting valve 23 actuated by the accelerator-controlling linkage 67. The adjustable valve 70 comprises a biased sleeve 75 which slides over the rod and moves therewith. Its position with respect to said rod can be adjusted by a screw-threaded adjustable collar 76. As the rod slides in the direction of the arrow F and said collar abuts the wall of the housing 17 (FIG. 1), the sleeve 75 is stopped and opens a passageway between the rod and the collar for discharging air from the chamber 18 into the atmosphere, when the piston 16 is moved in the opposite direction, $F_1$.

The chamber 19 is connected by a three way venting magnetic valve 24, with a vacuum reservoir 25 or the atmosphere.

In addition, a centrifugal switch 29 is connected to the motion-transferring mechanism of the vehicle speedometer.

FIG. 4 shows in detail the three way venting magnetic valve 24 operatively connected to the chamber 19 of housing 17 through a port. The valve 24 substantially comprises a coil 31 surrounding a magnetic core 32 integral with the casing 33 of the coil.

The armature 34 of the magnetic valve is positioned beneath the core 32, said armature being downwardly biased by a spring 35.

The armature 34 has a cylindrical extension 36 which carries on its lower end portion an annular gasket 37 adapted to close a first annular passage opening 38 when the armature is moved upwards and a second annular passage 39 when the armature is moved downwards. The passage 38 communicates with duct 40 which opens into the atmosphere, whereas the passage 39 communicates with the vacuum reservoir 25 through duct 41.

The operation of the magnetic valve 24 described above is as follows. When the coil 31 is deenergized, the armature 34, under the influence of its own weight and the action of spring 35 moves downwardly and places gasket 37 in sealing contact with passage 39, and leaves the passage 38 open so that air from the atmosphere is allowed to enter chamber 19 through the duct 40, the passage 38 and the port 30.

As the coil 31 is energized, the core 32 draws the armature 34 upwards, so that the gasket 37 closes passage 38 and opens passage 39, thus establishing communication between the chamber 19 and the vacuum reservoir 25 via the duct 41, the passage 39 and the port 30.

FIG. 5 is a detailed illustration of the one way venting magnetic valve 21 in its deenergized position, said valve comprising a coil 42 and a core 43, the latter carrying at one end a gasket 44.

The core 43 is separated by a downwardly-biasing spring 45, from a member 46 on the valve casing. Ducts 47 and 47' provide an inlet for air from the atmosphere. An adjustment screw 52 in member 46 intersects duct 47.

The magnetic valve 21 is connected to the chamber 18 of housing 17 through a port 48 formed in connection element 49. When the coil 42 is deenergized, the core 43, under the bias of its own weight and the spring 45, moves downwards and opens the passage of air from duct 47 to port 48 through the annular passage 50 formed between the core 43 and the walls of its seat 51.

The flow of air through the duct 47 is adjusted by manipulating the adjustment screw 52. As the coil 42 is energized, core 43 is drawn upwards and gasket 44 closes the passage of atmospherical air from duct 47 to the passage 50 and thus to the port 48.

FIG. 6 is a cross-sectional view of one embodiment of the gradual venting valve 23 which comprises a solid rubber plunger 53 with a stem 54. The plunger is slidable within a tube 55 having a set of radial vent holes 56 adjacent one end. The tube 55 is closed at one end by a first plug 57 acting as a guide for the stem 54 which is connected to the accelerator linkage (FIG. 1) and, at the opposite end adjacent the vent holes, by a second plug 58 having a duct 59 for connecting the air outlet piping 23' with the chamber 18 of cylinder 17.

Upon movement of the accelerator control linkage 67, the plunger 53 is caused to slide in the direction of the arrow $F_2$ and opens first the port of duct 59 and then, progressively, the venting holes 56 thus permitting that air coming from the chamber 18 to be progressively discharged.

FIG. 7 is a sectional view of a one embodiment of the centrifugal switch 29 which comprises an oscillating ring core 60 pivoted about a shaft 61 which is rotated by the transmission members of the gear shifting mechanism and which drives the vehicle speedometer.

A conical ring member 62 of a dielectric material is affixed to the shaft 61. The ring 62 carries on its vertical periphery a contact ring 63 and a magnet 64 is affixed to a portion of the conical surface.

In addition, the core 60 has on one end, a member 65 for limiting the extent of oscillation of said core and, diametrally, a contact member 66 which contacts the ring 63 through the magnet 64, said contact ring 63 being connected to a relay 71 (FIGS. 1 and 2) by contact spring 63'. Moreover, the core 60 has a weight distribution such as to ensure that when the vehicle is inoperative or and until a predetermined speed of the vehicle is reached, (for example 15 miles an hour), the core 60 remains in the position shown in FIG. 7, the circuit of the relay 71 aforementioned being kept closed.

At a speed higher than 15 miles an hour, the centrifugal force originated by the rotation of the shaft 61 causes the core 60 to be displaced in the direction of arrow $F_3$, separating the contact member 66 from the ring 63 and opening the circuit of the relay 71. The latter will give rise to a sequence of actions which will be now explained in describing the overall operation of the device.

For better clarity, the electric circuit of the device will be now described together with the operation of the device.

The operation of the device as a whole is as follows with reference to FIGS. 1 and 2. The cutoff switch 26 of the assembly is closed and the accelerator is in its at rest position. Closing the usual ignition contact 27 of the engine by introducing the ignition key into the switch energizes the three way magnetic valve 24 to effect closing of passage 38 and prevent the flow of air into the chamber 19 and the opening of passage 39 to put said chamber in communication with the vacuum reservoir 25.

The pressure differential which is originated between the chambers 18 and 19 due to the introduction of atmospherical air in 18 through the unidirectional valve 20 automatically shifts the piston 16 in the direction of the arrow F (FIG. 2).

As a result, the clutch is disengaged by the movement of stem 15 against flexible member 14 which actuates the linkage 11, 12, 13.

The above described actions occur with the engine stopped and providing there is a vacuum in the reservoir 25. If there is no vacuum, a few seconds of engine running are sufficient to create the vacuum, since the reservoir is connected to the engine manifolds.

The clutch engagement stage is started with the depression of the accelerator and movement of its control linkage which immediately closes the microswitch 68. Closure of the latter deenergizes the magnetic valve 24 and closes passage 39.

The communication of the chamber 19 with the vacuum reservoir 25 is thus cut off and communication with the atmosphere is restored through duct 40.

The bias of the clutch spring diagrammatically shown at 69 causes the piston 16 to move back in the direction of the arrow $F_1$ (FIG. 1), thus compressing the air already drawn into the chamber 18.

The air pressure in the chamber 18 stops the return stroke of the piston 16 and thus also the reengagement of the clutch just at the outset of the friction lining slipping movement. Stoppage of the piston stroke is preset by adjusting the adjustable valve 70.

The friction clutch remains in its slipping condition if the acceleration is maintained within a preselected limit and thus permits smooth starts and easy parking maneuvers.

As the acceleration limits are exceeded, the gradually operating venting valve 23 is opened so that the pressure in the chamber 18 is released and a complete reengagement of the clutch is immediately obtained, thus suppressing slippage beyond the strictly necessary limits.

Every time the accelerator is returned to its undepressed position the microswitch 68 closes and thus the clutch is disengaged until the vehicle runs at about 25 kms. an hour.

As the latter speed is attained, the centrifugal switch 29, actuated by shaft 61 functions as described above, opens the circuit of the relay 71 and thus inactivates two elements of the device.

In the first instance, the operation of the microswitch 68 is discontinued so that the automatic clutch disengagement is prevented at each return of the accelerator to its undepressed position. Thus the braking action of the vehicle engine during slowing down is preserved.

In the second instance, the venting magnetic valve 21 is deenergized and thus the chamber 18 is again connected with the atmosphere, while the rapid reengagement of the clutch is made possible both during shifting from low gear to high gear and vice versa.

To carry out gear shifting, clutch disengagement takes place only with the closure of a switch 72 placed in the knob of the gear shift lever and connected to the coil 28 of the three way magnetic valve 24 by relay 73.

As the vehicle speed decreases gradually or suddenly, to below 20—25 kms. an hour approximately, the centrifugal switch 29 closes the circuit of the relay 71 again and the clutch is disengaged automatically.

Thus one reverts exactly to the starting conditions and the reengagement of the clutch is again proportional to the degree of depression of the accelerator, irrespective of the gear ratio adopted.

When the engine is to be accelerated with the hand throttle (not shown), the microswitch 68 remains open and cannot cause disengagement of the clutch as discussed above. A relay 73, connected to the valve 24 is then activated by relay 71 until relay 71 is opened by switch 29.

The closure of the contact of said relay 73, which depends on the closure of the relay 71 (and therefore takes place only below 25 kms. miles an hour) an energizing valve 24, thus causing the clutch to be disengaged.

Relay 73 is also connected to switch 74 which is actuated by depression of the brake pedal (not shown). Thus when the vehicle speed is reduced to 15 miles an hour by action of the brakes, relay 73 will energize valve 24 to disengage the clutch.

The relay 71 is intended to absorb the current load of the electrical appliances to prevent the disengagement of the centrifugal switch 29 from overload. The automatic friction clutch servomechanism may be disconnected by actuating the toggle lever 26 placed on the vehicle dashboard.

It is important to note that anyone skilled in the art may introduce modifications and variations into the embodiments of the inventive device without departing from the scope of said invention.

I claim:

1. A servomechanism for automatically actuating the friction clutch of a vehicle as a function of vehicle speed comprising a housing, a piston slidable within said housing to divide said housing into two pressure chambers of variable volume, said piston having a piston rod extending through one of said chambers and one end wall of said housing and connected to the clutch pedal linkage, an exhaust valve for said one chamber formed by a sleeve encircling said rod and movable therewith in sealing contact with said one wall, a valve assembly on said one end wall connected to the accelerator linkage to controllably vent said one chamber when the accelerator is depressed, an inlet valve in said one wall for the automatic intake of atmospheric air into said one chamber upon movement of said piston, a first magnetic valve in said one wall to vent said one chamber and connected to a first relay, said valve being actuated by said relay when a predetermined speed is exceeded, a second magnetic valve in said other end wall of said housing selectively connecting said other chamber with a vacuum reservoir to disengage said clutch or atmospheric air to engage said clutch, said second magnetic valve being connected to said first relay and also being connected to a second relay, a microswitch activated by the accelerator movement and connected to said first relay and to said second relay to activate said second magnetic valve when the vehicle speed is below said predetermined speed, and a centrifugal switch positioned on the shaft of the speedometer linkage and connected to said first relay, said switch being adapted to be opened when the vehicle speed exceeds said predetermined speed.

2. The servomechanism of claim 1 further comprising a contact switch activated by the brake pedal of the vehicle and connected to said second relay to energize said second magnetic valve when the vehicle speed decreases to said predetermined vehicle speed.

3. The servomechanism of claim 1 further comprising a mechanism activating switch on the gear shift lever of said vehicle, said switch being connected to said second relay to energize said second magnetic valve.

4. The servomechanism of claim 1 further comprising a servomechanism disengaging switch interposed between the ignition switch of said vehicle and said first relay.

5. The servomechanism of claim 1 wherein said sleeve is biased at its inner end against the inner surface of said one end wall and carries an adjustable collar at its outer end to limit its movement with the said rod toward the said other wall so as to form an exhaust passage between the said rod and the inner surface of said sleeve when said collar abuts the outer surface of said one end wall.